United States Patent [19]
Johansson

[11] 3,942,239
[45] Mar. 9, 1976

[54] METHOD OF LINING A STEEL STRUCTURE

[75] Inventor: Gert Johansson, Skelleftea, Sweden

[73] Assignee: Skega Aktiebolag, Ersmark, Sweden

[22] Filed: Mar. 5, 1974

[21] Appl. No.: 448,421

[30] Foreign Application Priority Data
Mar. 6, 1973 Sweden .............................. 7303134

[52] U.S. Cl. ................. 29/462; 105/423; 220/63 R; 228/140
[51] Int. Cl.² ......................................... B61D 17/18
[58] Field of Search .......... 29/462, 471.3, 475, 526; 105/422, 423; 220/63 R; 241/182, 183; 228/140

[56] References Cited
UNITED STATES PATENTS

| 2,174,988 | 10/1939 | Lundvall ........................ 105/423 X |
| 2,744,863 | 5/1956 | Andrus ............................ 220/63 R |
| 3,107,867 | 10/1963 | Svensson et al. ................ 241/183 X |
| 3,528,165 | 9/1970 | Williams et al. ................. 29/475 X |

Primary Examiner—Al Lawrence Smith
Assistant Examiner—James G. Smith
Attorney, Agent, or Firm—Fred Philpitt

[57] ABSTRACT

A method of lining a steel wall surface with an elastomeric material which involves applying a layer of elastomeric material against said steel wall surface and holding said elastomeric material against said steel surface with a plurality of bolts and washers, said bolts being butt welded to said steel surface.

1 Claim, 5 Drawing Figures

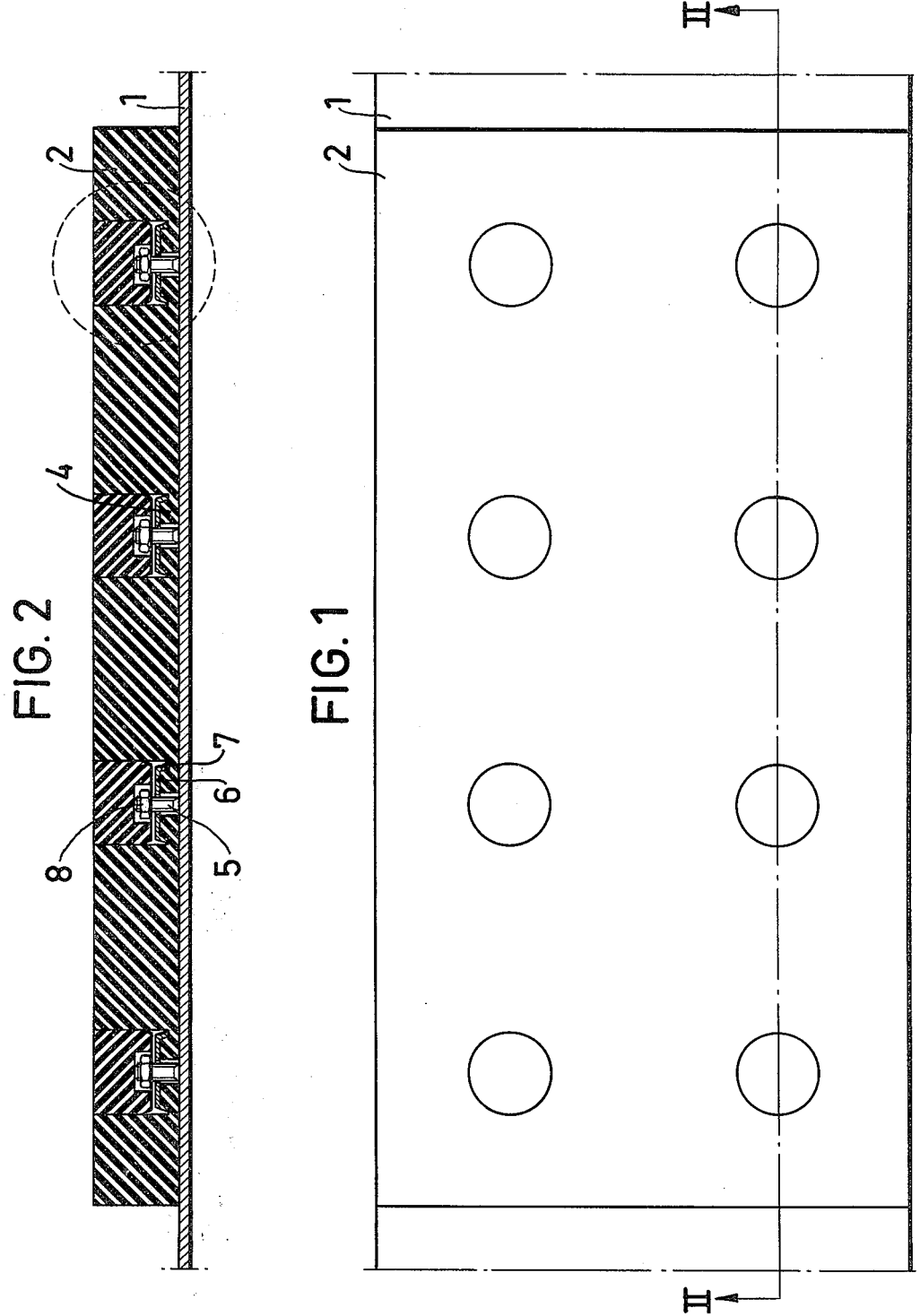

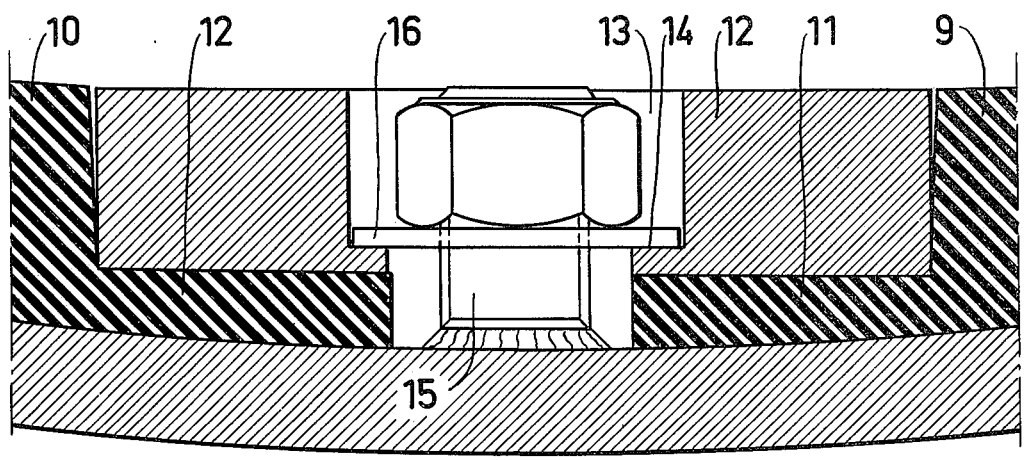
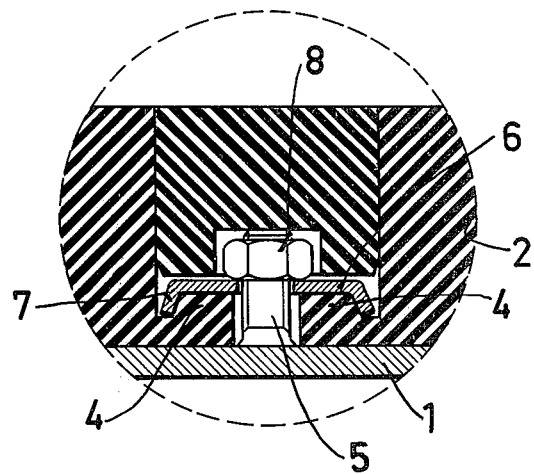

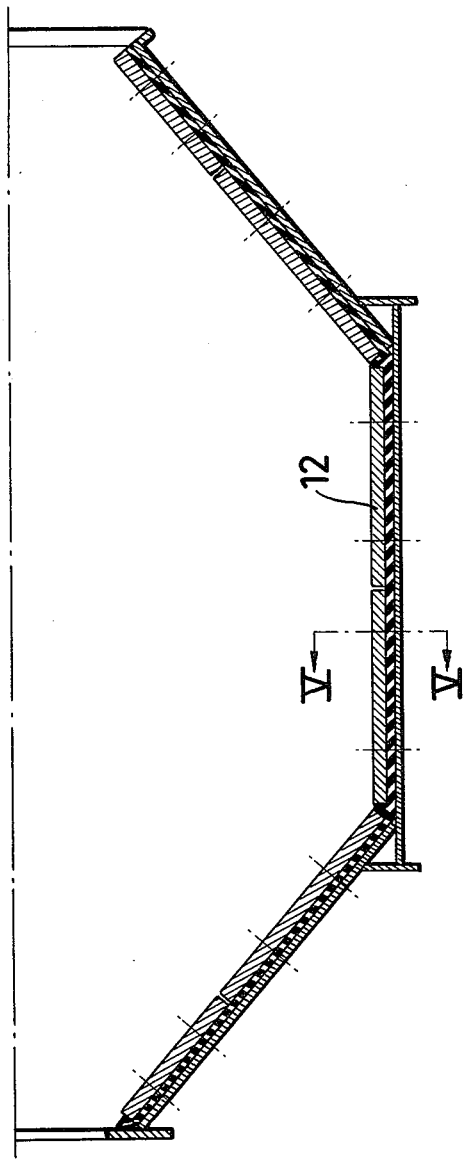

METHOD OF LINING A STEEL STRUCTURE

It was heretofore usual at such linings to drill holes through the steel structure in order to secure bars or washers by means of a bolt and a nut on the outside. In some cases the holes in the steel structure were so threaded that it was possible to clamp the lining from the lining side.

This has brought about in most cases a good connection, but it has involved disadvantages:

1. long mounting times, because the drilling and, possibly, threading operations are to be carried out manually, as no machine tools are available for this kind of work, and therefore require much time. At some truck platforms it was even impossible to drill and the holes had to be made by means of cutting torches.
2. considerable reduction in strength by rows of holes. Hole rows drilled previously and not adapted for use still remain in most cases and deteriorate the situation.
3. at the drilling in steel structures for securing linings, the structure must be accessible from outside. This has necessitated the erection of special expensive stands, or mounting alternatives had to be accepted which from a labour protection point of view are repulsive.
4. bores in steel structures, with through bolts for securing the lining and with nuts on the outside, mostly with intermediate washers, render the structure an appearance similar to a porcupine. These structures are in most cases rotary, and the projecting quills seriously endanger the workers. If a cloth piece or long hair should fasten in the quills, a serious accident may occur.
5. for damping high sound levels, heretofore mostly large sound-damping housings were used. The present invention makes such clumsy arrangements superfluous.
6. at existing steel structures, often no access from outside to certain areas of the lining side is possible at all. In such cases it was impossible to secure the lining in a satisfactory manner, and one had to be satisfied with a half measure.
7. when drilling through holes it sometimes happens, that it is entirely impossible to satisfactorily seal the holes in the case of wet operations.

All of the aforesaid disadvantages are eliminated by the present invention, which is characterized in that, after the positioning of the plates on the steel structure side to be protected, the bolts are butt-welded against said side through holes extending through the plates or along the plate edge, and that said holes or plate edge are provided with a shoulder for clamping the plates by means of a nut, washer, bar or the like.

At truck platforms and similar plane objects suitably a round washer with folded-down edges is placed into the hole on the shoulder about the bolt, and the clamping is effected by a nut.

A particularly suitable embodiment of this kind is characterized in that, after the clamping of the plates, a cylinder, for example of rubber or plastic, is inserted into the hole above the clamping means, and that the height of said cylinder is slightly (a few millimeters) lower than the depth of the hole, so that a clearance exists between the clamping means and the cylinder bottom.

When, however, round objects are to be lined, for example concrete mixers or mills, the plates most suitably are positioned adjacent one another with so much space therebetween as to provide place for butt-welding the bolts in said space, and a bar with holes is placed on the two shoulders located adjacent one another, whereafter butt-welding of the bolts is carried out through the holes. When deemed suitable, the holes in the bar can be drilled so that a shoulder is formed to provide holding for a countersunk nut.

The resulting gains are as follows 1. the mounting times are shortened to a tenth of the times heretofore usual.
2. no reduction in strength.
3. the mounting is substantially entirely undangerous from a labour protection point of view.
4. the outside is substantially smooth, and rotary structures, therefore, do not get hold in long hair, beards or cloth pieces of the workers.
5. the invention has rendered possible a lining of the apparatus proper, so that bulky sound-damping housings are unnecessary.
6. by applying the invention, accessibility from outside is no longer required, and linings can be secured also in such areas on the lining side which are not accessible at all from outside.
7. any risk of leakage is eliminated as no holes are made.

The invention is explained in greater detail in the following, with reference to the accompanying drawings, in which FIG. 1 illustrates a plate seen from above for lining a truck platform, FIG. 2 shows the same plate in a section after the line II—II in FIG. 1, FIG. 3 is an enlargement of a detail in FIG. 2, FIG. 4 is a vertical longitudinal section of one half of a concrete mixer, and FIG. 5 is a section after the line V—V in FIG. 4.

The problem illustrated in FIGS. 1–3 is to protect the inside of a truck platform against wear and impacts from a load of coarse rock. The platform 1, therefore, is protected by a thick rubber lining 2, which consists of a plurality of rubber plates with the dimension 0.5 × 1 m. The 8 cm thick plates are retained in place by drilling holes 3 into the plates, which holes located closest to the platform are terminated by a shoulder 4. A pin bolt 5 is welded on the platform by butt-welding at which a welding gun of Philips make is used. A round washer 6 with folded down edges 7 is threaded over the bolt, and the entire arrangement is clamped by means of a nut 8. Finally a rubber cylinder is inserted into the hole over the securing means.

FIGS. 4 and 5 illustrate a way how to protect the inside of a concrete mixer against wearing by the concrete. For this purpose, the inside has been lined with rubber plates 9 and 10. The plates are provided along their edge with shoulders 11 and 12 and positioned adjacent one another along the generatrices with a space between each plate. A bar 12 is placed on the shoulders, which bar has a plurality of through holes 13 with shoulders 14. Through these holes the bolt 15 is welded on the shell plate of the concrete mixer. A washer 16 is placed on the shoulder 14, and thereafter the nut is tightened.

As the plates are secured along the edge as shown in FIGS. 4 and 5, the bolts can be welded before the plates are positioned. In that case the surface to be protected is to be marked and the bolts are to be welded in the marked places.

I claim:

1. A method for lining a steel wall surface with a layer of elastomeric material which comprises:

a. disposing a layer of elastomeric material directly against said steel wall surface, said elastomeric material having a plurality of holes therein which provide access through said layer of elastomeric material to said steel wall surface, b. inserting bolts into each of said holes, c. butt welding each bolt end which contacts said steel wall surface directly to said steel wall surface so that each bolt, when welded to said steel wall surface, extends substantially perpendicularly to said steel wall surface, the end of the bolt furthest from steel wall surface being threaded, d. placing a washer over the threaded end of each bolt and resting it against a recessed shoulder portion of said elastomeric material that is spaced away from said steel wall surface, e. tightening a nut on the threaded end of each bolt so as to both press said washer downwardly against said elastomeric material and to press said elastomeric material against said steel wall surface, and f. inserting a cylinder of elastomeric material into the hole above said nut after the nut is tightened on said bolt.

* * * * *